US012225023B2

(12) United States Patent
Ferreira et al.

(10) Patent No.: US 12,225,023 B2
(45) Date of Patent: Feb. 11, 2025

(54) REVEALING BYZANTINE ATTACKERS THROUGH SMART RE-CLUSTERING IN FEDERATED LEARNING

(71) Applicant: Dell Products L.P., Round Rock, TX (US)

(72) Inventors: Paulo Abelha Ferreira, Rio de Janeiro (BR); Pablo Nascimento da Silva, Niterói (BR); Maira Beatriz Hernandez Moran, Rio de Janeiro (BR)

(73) Assignee: Dell Products L.P., Round Rock, TX (US)

(*) Notice: Subject to any disclaimer, the term of this patent is extended or adjusted under 35 U.S.C. 154(b) by 309 days.

(21) Appl. No.: 18/045,527

(22) Filed: Oct. 11, 2022

(65) Prior Publication Data
US 2024/0121248 A1     Apr. 11, 2024

(51) Int. Cl.
*H04L 9/40*    (2022.01)
*G06N 20/00*   (2019.01)

(52) U.S. Cl.
CPC ......... *H04L 63/1416* (2013.01); *G06N 20/00* (2019.01); *H04L 63/1491* (2013.01)

(58) Field of Classification Search
CPC .... G06N 20/00; G06N 3/098; H04L 63/1416; H04L 63/1491; H04L 63/1425; G06F 18/285; G06F 11/3688; G06F 3/0482
See application file for complete search history.

(56) References Cited

U.S. PATENT DOCUMENTS 11,025,666 B1* 6/2021 Han ................... H04L 63/1416

FOREIGN PATENT DOCUMENTS

CN    101534429 B   *   2/2011

OTHER PUBLICATIONS

S.-M. Huang, Y.-W. Chen and J.-J. Kuo, "Cost-Efficient Shuffling and Regrouping Based Defense for Federated Learning," 2021 IEEE Global Communications Conference (GLOBECOM), Madrid, Spain, 2021, pp. 1-6, doi: 10.1109/GLOBECOM46510.2021. 9685499. (Year: 2021).*
Raj Kiriti Velicheti, Derek Xia, and Oluwasanmi Koyejo, "Secure Byzantine-Robust Distributed Learning via Clustering" arXiv arXiv: 2110.02940, 2021 (Year: 2021).*
Velicheti, Raj Kiriti, Derek Xia, and Oluwasanmi Koyejo. "Secure Byzantine-Robust Distributed Learning via Clustering." arXiv preprint arXiv:2110.02940 (2021).
Blanco-Justicia, Alberto, Domingo-Ferrer, Joseph, Martínez, Sergio, Sánchez, David, Flanagan, Adrian, and Tan, Kuan Eeik. "Achieving security and privacy in federated learning systems: Survey, research challenges and future directions." Engineering Applications of Artificial Intelligence 106 (2021): 104468.

* cited by examiner

*Primary Examiner* — Kambiz Zand
*Assistant Examiner* — Amir Mahdi Hajiabbasi
(74) *Attorney, Agent, or Firm* — Workman Nydegger

(57)    ABSTRACT

Identifying malicious clients in federated learning is disclosed while enhancing privacy. The clients are clustered such that cluster updates in the federated learning are generated. When a suspect cluster is identified, clients in the suspect clusters are labeled as suspect and clients in clusters that are not suspect are labeled as fair. The clients are reclustered and the clusters and clients are relabeled without changing the labels of clients that were previously deemed fair. After one or more iterations, the malicious clients are identified, and corrective actions can be performed.

20 Claims, 4 Drawing Sheets

REVEALING BYZANTINE ATTACKERS THROUGH SMART RE-CLUSTERING IN FEDERATED LEARNING

FIELD OF THE INVENTION

Embodiments of the present invention generally relate to detecting malicious computing attacks. More particularly, at least some embodiments of the invention relate to systems, hardware, software, computer-readable media, and methods for detecting and revealing computing attacks in environments including federated learning environments.

BACKGROUND

Federated learning, in general, is a technique whose objective is to achieve a goal in a distributed manner. In the context of machine learning, multiple nodes may use local data to each train a local model. Each of the nodes may transmit learning updates to a central node. The central node is configured to incorporate updates from multiple nodes into a global model. The central node may generate a global update that can be returned and incorporated to the local models at the various nodes. This process can be repeated, for example, until the global model converges.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
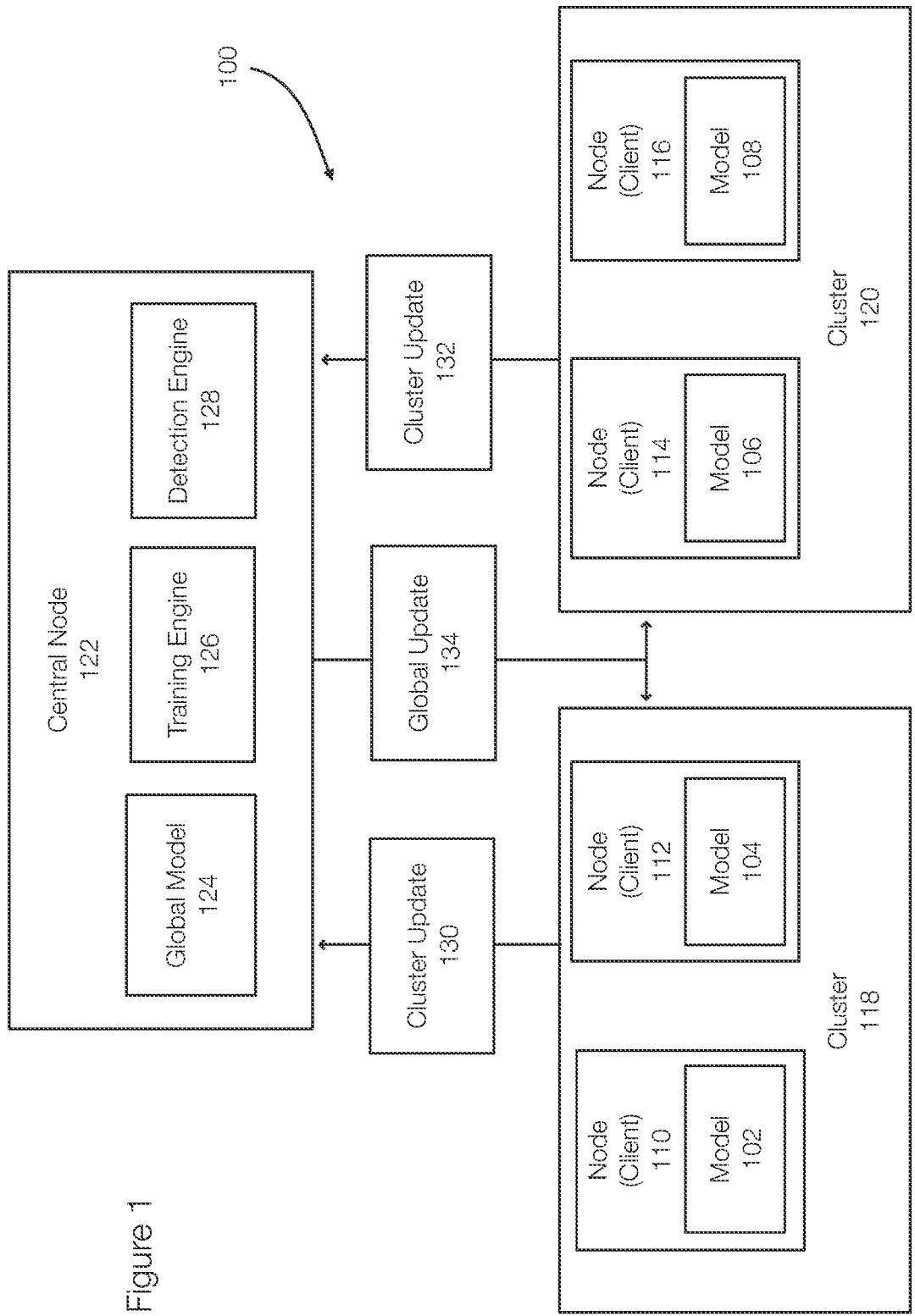
FIG. 1 discloses aspects of aspects of federated learning that is attacked by a malicious client.

Embodiments of the present invention generally relate to federated learning in the context of machine learning and machine learning models. More particularly, at least some embodiments of the invention relate to systems, hardware, software, computer-readable media, and methods for a defense protocol in federated learning systems and environments.

By way of example, federated learning is a distributed framework for machine learning where clients operating on nodes jointly train a model without ever sharing their local or individual data with other clients or with the central node. This is beneficial for entities that may provide private distributed machine learning. In this type of federated learning, machine learning models are distributed to nodes (e.g., in one or more edge environments) where data may be kept local or private for various reasons such as compliance requirements, cost concerns, or strategic reasons.

Federated learning, in the context of machine learning scenarios, provides strong privacy assurances at least because the local data is not viewed globally. In federated machine learning, machine learning models are trained locally using local data. Local updates learned or identified at a local model (e.g., updated gradients) are sent to a global model operating at a central node. The central node then incorporates updates from multiple local models and returns a global update back to all of the nodes that can be incorporated into the local models.

However, federated machine learning may be subject to attacks such as Byzantine attacks. In a Byzantine attack, a client operating at a node or the node itself is compromised. The compromised client can disrupt the coordination between the clients and the central node and can disrupt the transfer of model updates. This is typically performed by modifying the gradient. Sending a compromised or incorrect gradient can disrupt model training and convergence.

More specifically, one objective of a Byzantine attack is to prevent the global model from converging correctly. In a Byzantine attack, an attacker may compromise a node or a client operating on the node. The compromised client may send compromised updates to the central node. These updates interfere or prevent the global model from being trained properly and may prevent convergence of the global model.

The attack is performed mainly by manipulating the compromised node to send defective updates to the server to introduce incorrect bias in the aggregation process. A malicious client can induce the aggregation rule result ($F_{lin}$) to yield a constant value T. $F_{lin}$ may be defined as $F_{lin}(\delta_1, \ldots, \delta_m) = \Sigma_u \alpha_u \delta_u$, where each $\alpha_u$ are non-zero scalars. If the Byzantine client sends $\delta_m = (1/\beta_m)^* T - \Sigma^{m-1}_{u=1}(\alpha_u/\alpha_m)^* \delta_u$, then $F_{lin} = T$.

If the malicious client could access the updates sent by other clients, the attack would be immediate. However, this is not realistic because many federated learning configurations implement protocols to ensure privacy, including protecting the updates from inadequate access.

However, the malicious client may estimate the updates of other clients or their sum. For example, when the training process is advanced, the global model is close to convergence. In this scenario, the updates sent by the clients in consecutive rounds are very similar. This allows the malicious client to estimate the sum of the updates of other clients from a previous round by subtracting its own update from the global model. Based on this information, the malicious client tries to replace or adversely impact the global model. This is achieved by creating a special local update that nullifies the updates of other clients while boosting the update of the malicious client.

SHARE (Secure Hierarchical Robust Aggregation) is a framework that incorporates defenses against Byzantine attacks, while enhancing privacy aspects. The SHARE framework may allocate clients in clusters randomly. Clients in each cluster mask their own updates using pairwise secret keys shared between them. This enhances the privacy of the clients and their individual updates. The server learns just their mean. Next, the secure cluster averages are filtered through robust aggregation (ex.: median, Zeno, etc.) in order to eliminate clusters with Byzantine clients, according to their updates. These actions are repeated several times, and in each global epoch the clients are re-clustered randomly. One of the main limitations of this framework is the communications cost due to the key exchange sharing.

More specifically, the SHARE protocol runs on top of a federated learning system and, assuming that there is clustering of clients and that secure aggregation is performed at each cluster, generates one (summed) gradient $g_r^j$ per cluster j and per re-clustering round r. SHARE runs a loop of R re-clusterings and at each re-clustering, SHARE generates an aggregated $g^r$ by performing robust aggregation with all the $g_j^r$ for the current re-clustering round. After R re-clusterings rounds, a list of size R containing different aggregated gradients $g^r$ is obtained. SHARE computes a central gradient including a mean overall $g^r$.

Even if SHARE is attempting to defend from Byzantine attacks, this protocol does not identify the malicious client.

Embodiments of the invention relate to a defense protocol to identify the compromised client or node (the Byzantine attacker) while guaranteeing privacy as much as possible. The ability to identify the attacker (e.g., the compromised client) is distinct from a federated learning system that is resilient to such attacks.

To enhance privacy, embodiments of the invention may cluster multiple nodes (or clients) together into clusters. This allows machine learning model updates to be aggregated as cluster updates prior to being transmitted to a central node. In one example, the individual updates are aggregated using a robust aggregation process, such as taking a median value per dimension from all gradient vectors. This may be repeated a given number of times and the mean of all robustly aggregated vectors is provided to the central node.

More specifically, federating learning settings include clustering steps in which the clients are grouped in order to inform composed updates for each cluster instead of individual client updates. This improves privacy. From a general perspective, the cluster sizes can affect the privacy and robustness of the federated learning system.

Each cluster sends updates composed of the combination of the local updates of each of the cluster clients. In clusters with few clients, each client update has a larger impact on the cluster updates. Consequently, the cluster update in these small clusters reveals more information about each client, consisting of a privacy threat. On the other hand, larger clusters present a higher probability of containing a compromised (e.g., Byzantine) client. In this sense, the cluster size can be considered a trade-off in this federated learning configuration because its value can affect both privacy and robustness.

Embodiments of the invention relate to identifying attackers or to reducing a set of suspect clients. This is achieved, in part, by repeatedly performing a clustering operation where the clients are shuffled after each clustering event. During each clustering event or round, clients are identified as fair, suspect, or attacker based on the cluster membership. This protocol allows attackers to be identified in federated learning scenarios while still providing strong privacy assurances. Once a client is identified as fair, the label does not change during the defense protocol. By re-clustering the clients, a compromised client will eventually be identified when grouped with other clients that are determined to be fair or not compromised.

In federated learning, one objective is to train, in an iterative manner, a model based on the data processed at individual nodes. The nodes, for example, may be edge nodes that participate in federated learning with a central node at, for example, a datacenter. In each global iteration, sampled nodes (not all nodes are required to participate in the federated learning) may run a stochastic gradient descent using local data to obtain local model updates. These local model updates are aggregated at the central note to compute a global model update that can be returned to and incorporated into the local models.

Because it may be possible to infer a client's data from the gradients provided by a client, clustering updates from multiple clients can improve privacy. This improves on the privacy of preventing the server from directly manipulating client data—the cluster updates do not include client data and do not associate specific updates with specific clients. Privacy can be further enhanced using a pairwise secret key techniques when sharing updates or receiving global updates.

A federated learning environment may include a large number of clients. Although privacy is enhanced using robust aggregation, the contribution of a cluster can be compromised by the presence of a single attacker (e.g., a single Byzantine client or node). Because the server only receives cluster updates, the client responsible for the contamination cannot be readily identified. Further, when the cluster size is large, there are many suspect clients. Embodiments of the invention are configured to identify the attacking clients/nodes within a given cluster.

FIG. 1 discloses aspects of federated learning in the context of machine learning models and machine learning. FIG. 1 illustrates nodes 110, 112, 114, and 116, which include respectively, models 102, 104, 106, and 108. The nodes 110, 112, 114, and 116 may include or are associated with processors, memory, networking hardware, or the like and may by physical machines, virtual machines, containers, or the like. The nodes 110, 112, 114, and 116 are also examples of clients of a central node 122.

In this example, the nodes 110 and 112 are in a cluster 118 and the nodes 114 and 116 are in a cluster 120. The nodes 110, 112, 114, and 116 may have clients operating thereof. The node 110 may train the model 102 using data collected/generated at the node 110. In other words, the data used to train the model 102 is distinct from data used to train the other models 104, 106, and 108. Further, data local to the node 110 is not shared with the other nodes that participate in the federated learning system 100.

As the models 102, 104, 106, and 108 are trained, updates may be generated or identified by each of the nodes or clients. The cluster 118 may provide a cluster update 130 to the central node 122. The cluster update 130 includes updates from the model 102 and the model 104. The cluster update 130 may be generated using robust aggregation, such as may be obtained using a SHARE protocol. The cluster update 132 may be determined in a similar manner.

The training engine 126 of the central node 122 uses the cluster update 130 and 132 to train/update the global model 124. The training engine 126 may then generate a global update 134 that is distributed to the nodes 110, 112, 114, and 116 and used to update the models 102, 104, 106, and 108. This process may occur iteratively at least until, in one embodiment, the global model 124 converges. Once this occurs, the model is trained and may be used for inferences. Updates, however, may still be performed.

Figure 2A:
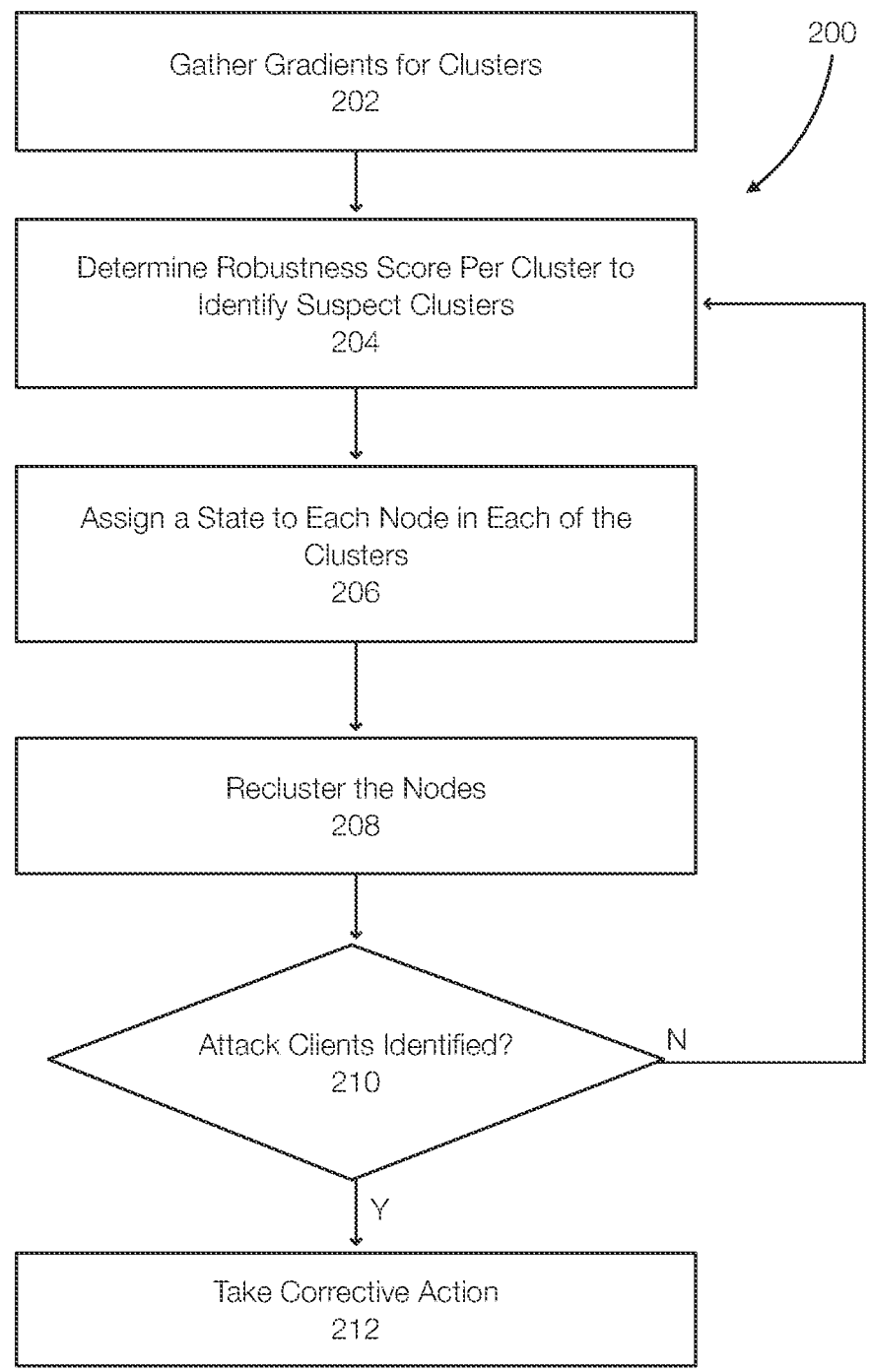
FIG. 2A discloses aspects of identifying a malicious client in an attack on a federated learning system.

FIG. 2A discloses aspects of identifying an attacking client (or node). As illustrated in FIG. 1, clients may be grouped into clusters. The method 200 may begin by gathering or determining 202 gradients for each of the clusters (e.g., a cluster update). The gradients for the clusters may be gathered via secure aggregation. A robustness score is determined 204 for each of the clusters. The robustness score may be determined by robust aggregation.

When the robustness score is determined, outlier or suspect clusters can be identified. The elements of gathering 202 gradients and determining 204 robustness scores may be determined during normal operation of federated learning. The process of identifying the attacking clients may be implemented only when an attack is indicated by the robustness score. For example, a cluster that has a robustness score below a threshold score may be determined as a suspect cluster. In one example, the robustness core may be a distance to a median.

Identifying a malicious client may be triggered in other manners. For example, a security warning may be generated in other security layers.

Once the defense protocol is initiated, training the model may not be prioritized or performed in actuality. However, sufficient aspects of federated learning may be performed such that the attacker is not apprised of having been discovered. Thus, the process of gathering gradients and determining robustness scores may continue after discovery of an attacking client.

Once the robustness score (or other factor) indicates that one or more clusters is suspect, a state is assigned to each of the client in each of the clusters. In this example, all of the client in the suspect clusters are assigned 206 a suspect label. All clients in clusters that are not suspect are labeled as fair.

Next, the clients or nodes are reclustered 208. In one example, the clusters are reformed or reorganized such that clients in a suspect cluster labeled as suspect are placed in different clusters. If the attack client 210 can be identified (Y at 210), corrective action is taken 212. If the attack client cannot be identified, the robustness score is determined for the reorganized clusters and the clients are assigned a state. All clients that were previously labeled as fair keep the fair label. However, the labels of clients that were labeled as suspect may change.

For example, a reorganized cluster that includes a client labeled as suspect may no longer be suspect based on the robustness score of the reorganized cluster. Thus, the label of that client may be changed to fair. This process may be repeated until the attack clients are identified or for a predetermined number of times. For example, reclustering may generate a cluster that includes three clients. If only one of the clients is labeled as suspect, the malicious client has been identified.

Figure 2B:
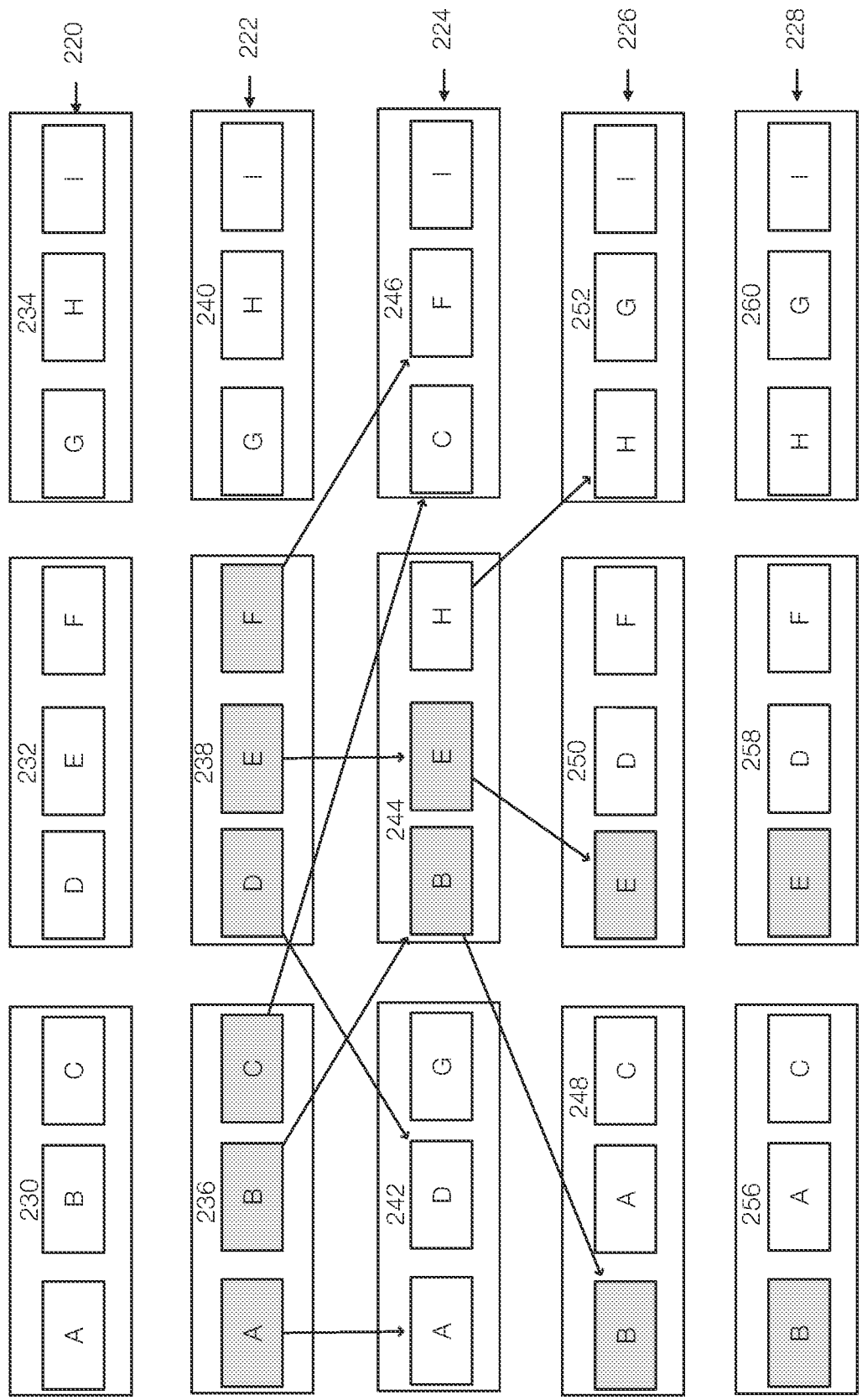
FIG. 2B discloses additional aspects of identifying a malicious client.

FIG. 2B illustrates an example of an identification operation. FIG. 2B illustrates clusters 220 that include clusters 230, 232, and 234. Robustness scores are determined for clusters 230, 232 and 234. The clusters 236, 238, and 240 correspond to the clusters 230, 232, and 234 after the robustness score has been determined.

In this example, the robustness score suggests that the clusters 236 and 238 are suspect. As a result, the clients ABC in the cluster 236 and the clients DEF in the cluster 238 are labeled as suspect because the clusters 236 and 238 have a robustness score that is below a threshold—the clusters 236 and 238 are suspect. The clients GHI in the cluster 240 are labeled as fair because the cluster 240 is not a suspect cluster.

Next, the nodes deemed to be suspect are redistributed using a re-clustering operation. After the nodes are reclustered, the clusters 224 include a cluster 242 with clients ADG, a cluster 238 with clients BEH and a cluster 246 with clients CFI. The robustness scores are again determined and only the cluster 244 is deemed as suspect.

As a result, the labels of clients A and D are changed from suspect to fair and the labels of C and F are also changed from suspect to fair. Next, a reclustering operation is performed to generate the clusters 226. In this example, the clients BEH from the suspect node 244 are distributed to other clusters.

Thus, the clients in the suspect cluster 244 are redistributed to generate the clusters 248 with clients BAC, the cluster 250 with clients EDF, and the cluster 252 with clients HGI. The robustness scores of these clusters 226 are again determined. This identifies that the clusters 248 and 250 are suspect.

However, the only client in the cluster 248 with a suspect label is B. Because the label of the nodes A and C is fair, B is identified as an attacking client. Similarly, the client E is also identified as an attacking client. The clusters 228 thus illustrate, after the defense protocol has been performed, that the nodes D and E in, respectively, the clusters 256 and 258 are the attacking clients. The cluster 260 does not include any attacking clients.

Embodiments of the invention relate to a defense protocol that allows nodes or clients to be reclustered in a manner that decreases the number of suspect clients in a few iterations. The attacking clients are identified by discarding fair nodes from being considered as suspect. When previously suspect clients are reclustered into a cluster that is not deemed to be suspect, the labels of previously suspect clients can be changed to fair.

The robustness score allows a cluster to be identified as suspect or fair and by labeling the clients as fair or suspect, the reclustering operations allows the specific attacking clients to be identified. Once the malicious clients are identified, the malicious clients can be removed, fixed, cleansed, or the like and the federated learning operation can resume.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations, attack detection operations, clustering operations, scoring operations, and the like or combinations thereof. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: detecting an attack in a federated learning system that includes clusters of clients that are configured to perform federated learning, generating a cluster score for each of the clusters, wherein the cluster score identifies which of the clusters are suspect clusters and which of the clusters are fair clusters, identifying the clients in the fair clusters as fair clients, identifying clients in the suspect clusters as suspect clients, repeating until a malicious client is identified: reclustering the clients into new clusters, determining a new score for each of the new clusters, wherein the new score identifies which of the new clusters are new suspect clusters and which are new fair clusters, labelling all suspect clients in the new fair clusters as fair clusters without changing labels of clients in the new fair clusters that are already labeled as fair, and labelling a client in one of the new suspect clusters as the malicious client when all other clients in that new suspect cluster are labeled as fair clients.

Embodiment 2. The method of embodiment 1, wherein reclustering is performed a predetermined number of times.

Embodiment 3. The method of embodiment 1 and/or 2, further comprising performing federated learning after detecting the attack to prevent the malicious client from knowing that the malicious client has been detected.

Embodiment 4. The method of embodiment 1, 2, and/or 3, wherein generating the score includes performing secure aggregation in each of the clusters to generate an aggregated gradient in each of the clusters.

Embodiment 5. The method of embodiment 1, 2, 3, and/or 4, further comprising performing robust aggregation to generate a gradient score for each input gradient used to generate the aggregated gradient.

Embodiment 6. The method of embodiment 1, 2, 3, 4, and/or 5, wherein the gradient score for each of the input gradients is a distance to a median gradient.

Embodiment 7. The method of embodiment 1, 2, 3, 4, 5, and/or 6, wherein the suspect clusters have a cluster score that exceeds a threshold gradient score.

Embodiment 8. The method of embodiment 1, 2, 3, 4, 5, 6, and/or 7, wherein reclustering the clients includes distributing the suspect clients to other clusters.

Embodiment 9. The method of embodiment 1, 2, 3, 4, 5, 6, 7, and/or 8, wherein suspect clients in a suspect cluster are all distributed to different new clusters.

Embodiment 10. The method of embodiment 1, 2, 3, 4, 5, 6, 7, 8, and/or 9, further comprising removing the malicious client from the federated learning system.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, agent, engine, or client may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
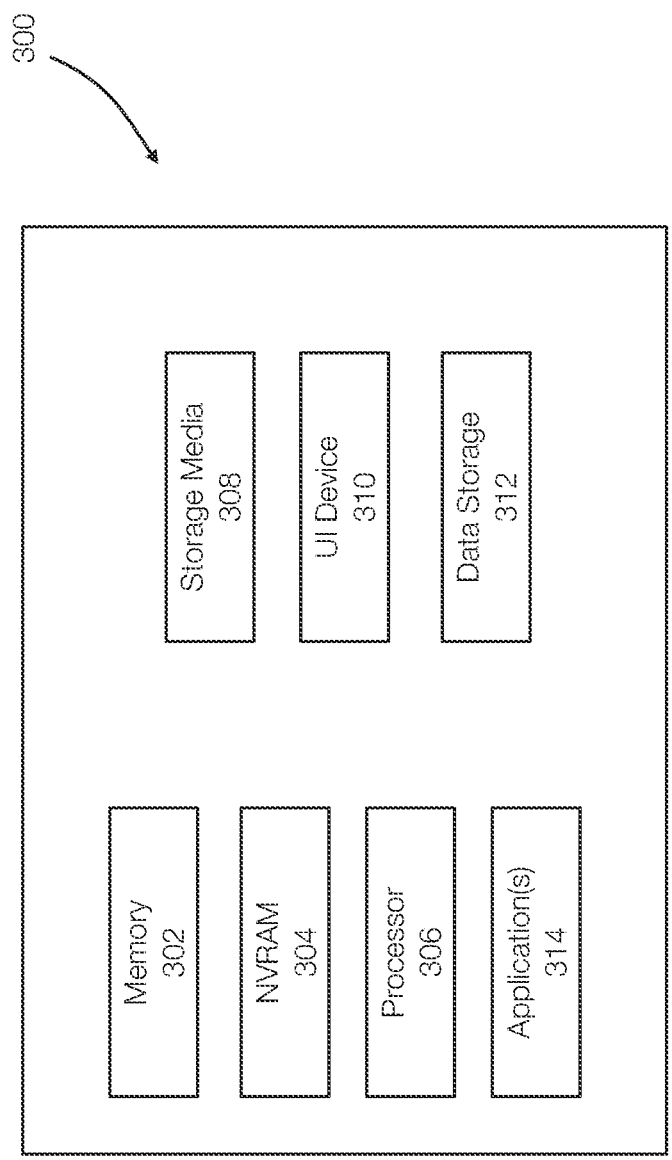
FIG. 3 discloses aspects of a computing device, system, or entity.

With reference briefly now to FIG. 3, any one or more of the entities disclosed, or implied, by the Figures, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid-state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting an attack in a federated learning system that includes clusters of clients that are configured to perform federated learning;
   generating a cluster score for each of the clusters, wherein the cluster score identifies which of the clusters are suspect clusters and which of the clusters are fair clusters;
   identifying the clients in the fair clusters as fair clients;
   identifying clients in the suspect clusters as suspect clients;
   repeating until a malicious client is identified:
      reclustering the clients into new clusters;
      determining a new score for each of the new clusters, wherein the new score identifies which of the new clusters are new suspect clusters and which are new fair clusters;
      labelling all suspect clients in the new fair clusters as fair clusters without changing labels of clients in the new fair clusters that are already labeled as fair; and labelling a client in one of the new suspect clusters as the malicious client when all other clients in that new suspect cluster are labeled as fair clients.

2. The method of claim 1, wherein reclustering is performed a predetermined number of times.

3. The method of claim 1, further comprising performing federated learning after detecting the attack to prevent the malicious client from knowing that the malicious client has been detected.

4. The method of claim 1, wherein generating the score includes performing secure aggregation in each of the clusters to generate an aggregated gradient in each of the clusters.

5. The method of claim 4, further comprising performing robust aggregation to generate a gradient score for each input gradient used to generate the aggregated gradient.

6. The method of claim 5, wherein the gradient score for each of the input gradients is a distance to a median gradient.

7. The method of claim 6, wherein the suspect clusters have a cluster score that exceeds a threshold gradient score.

8. The method of claim 1, wherein reclustering the clients includes distributing the suspect clients to other clusters.

9. The method of claim 8, wherein suspect clients in a suspect cluster are all distributed to different new clusters.

10. The method of claim 1, further comprising removing the malicious client from the federated learning system.

11. A non-transitory storage medium having stored therein instructions that are executable by one or more hardware processors to perform operations comprising:
   detecting an attack in a federated learning system that includes clusters of clients that are configured to perform federated learning;
   generating a cluster score for each of the clusters, wherein the cluster score identifies which of the clusters are suspect clusters and which of the clusters are fair clusters;
   identifying the clients in the fair clusters as fair clients;
   identifying clients in the suspect clusters as suspect clients;
   repeating until a malicious client is identified:
      reclustering the clients into new clusters;
      determining a new score for each of the new clusters, wherein the new score identifies which of the new clusters are new suspect clusters and which are new fair clusters;
      labelling all suspect clients in the new fair clusters as fair clusters without changing labels of clients in the new fair clusters that are already labeled as fair; and
      labelling a client in one of the new suspect clusters as the malicious client when all other clients in that new suspect cluster are labeled as fair clients.

12. The non-transitory storage medium of claim 11, wherein reclustering is performed a predetermined number of times.

13. The non-transitory storage medium of claim 11, further comprising performing federated learning after detecting the attack to prevent the malicious client from knowing that the malicious client has been detected.

14. The non-transitory storage medium of claim 11, wherein generating the score includes performing secure aggregation in each of the clusters to generate an aggregated gradient in each of the clusters.

15. The non-transitory storage medium of claim 14, further comprising performing robust aggregation to generate a gradient score for each input gradients used to generate the aggregated gradient.

16. The non-transitory storage medium of claim 15, wherein the gradient score for each of the input gradient is a distance to a median gradient.

17. The non-transitory storage medium of claim 16, wherein the suspect clusters have a cluster score that exceeds a threshold gradient score.

18. The non-transitory storage medium of claim 11, wherein reclustering the clients includes distributing the suspect clients to other clusters.

19. The non-transitory storage medium of claim 18, wherein suspect clients in a suspect cluster are all distributed to different new clusters.

20. The non-transitory storage medium of claim 11, further comprising removing the malicious client from the federated learning system.

* * * * *